United States Patent
Vroegop et al.

(10) Patent No.: US 9,687,005 B2
(45) Date of Patent: Jun. 27, 2017

(54) SKINNING INSTALLATION AND METHOD FOR REMOVING SKIN FROM SLAUGHTERED POULTRY PARTS

(71) Applicant: MAREL STORK POULTRY PROCESSING B.V., Boxmeer (NL)

(72) Inventors: Johannis Anthonie Vroegop, Nijmegen (NL); Maurice Eduardus Theodorus Van Esbroeck, Bemmel (NL); Erik Hendrikus Werner Peters, Boxmeer (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 14/902,165

(22) PCT Filed: Aug. 26, 2014

(86) PCT No.: PCT/NL2014/050574
§ 371 (c)(1),
(2) Date: Dec. 30, 2015

(87) PCT Pub. No.: WO2015/030579
PCT Pub. Date: Mar. 5, 2015

(65) Prior Publication Data
US 2016/0366897 A1  Dec. 22, 2016

(30) Foreign Application Priority Data
Sep. 2, 2013 (NL) .................................. 2011369

(51) Int. Cl.
*A22B 5/00* (2006.01)
*A22B 5/16* (2006.01)
*A22C 21/00* (2006.01)

(52) U.S. Cl.
CPC .......... *A22B 5/166* (2013.01); *A22C 21/0053* (2013.01); *A22C 21/0092* (2013.01)

(58) Field of Classification Search
CPC ........... A22B 5/16; A22B 5/161; A22B 5/163; A22B 5/165; A22B 5/166
(Continued)

(56) References Cited

U.S. PATENT DOCUMENTS 3,729,775 A * 5/1973 McDonald ............. A22C 25/17
452/130
4,606,093 A   8/1986 Townsend
(Continued)

FOREIGN PATENT DOCUMENTS

| CN | 101095427 A | 1/2008 |
|---|---|---|
| CN | 201101088 Y | 8/2008 |
| NL | 2007492 | 4/2013 |

*Primary Examiner* — Richard Price, Jr.
(74) *Attorney, Agent, or Firm* — Birch, Stewart, Kolasch & Birch, LLP (57) ABSTRACT

A skinning installation is adapted to remove skin from slaughtered poultry parts, e.g. from a part including the breast. A method for removing skin from slaughtered poultry parts, e.g. from the breast, uses the skinning installation. The installation includes a toothed skinning roller and an elongated shoe extending adjacent and essentially parallel to the toothed skinning roller. The shoe includes a central nose portion which is directed counter to the rotation direction of the skinning roller, having two side edges and a leading skin gripping edge, wherein the side of the nose portion facing the skinning roller comprises an arcuate surface having a curvature corresponding essentially to the curvature of the skinning roller, wherein a skin gripping gap is defined between the arcuate surface of the central nose portion and the skinning roller. The shoe further includes at least one bridging portion between the central nose portion and the end of the shoe that is fastened to the support frame,
(Continued)

arranged downstream of the leading skin gripping edge when seen in the rotation direction of the skinning roller, wherein a bridge clearance is defined between the bridging portion and the skinning roller.

18 Claims, 6 Drawing Sheets

(58) Field of Classification Search
USPC .......................................... 452/125, 128–130
See application file for complete search history.

(56) References Cited

U.S. PATENT DOCUMENTS

| | | | |
|---|---|---|---|
| 5,011,454 A * | 4/1991 | Townsend | A22C 17/12 |
| | | | 452/125 |
| 5,098,336 A * | 3/1992 | DeLong | A22B 5/166 |
| | | | 452/111 |
| 5,350,334 A * | 9/1994 | Holms | A22C 17/12 |
| | | | 452/125 |
| 6,244,950 B1 | 6/2001 | Long et al. | |
| 7,070,493 B2 * | 7/2006 | Hazenbroek | A22C 21/0092 |
| | | | 452/130 |
| 8,187,060 B1 | 5/2012 | Gasbarro | |
| 2003/0008606 A1 | 1/2003 | Hazenbroek et al. | |
| 2004/0166793 A1 | 8/2004 | Young et al. | |
| 2007/0026782 A1 * | 2/2007 | Bergman | A22B 5/166 |
| | | | 452/129 |
| 2010/0029186 A1 * | 2/2010 | Janssen | A22C 21/0023 |
| | | | 452/125 |
| 2011/0092146 A1 | 4/2011 | Gasbarro | |
| 2013/0157553 A1 | 6/2013 | Haines et al. | |

* cited by examiner

SKINNING INSTALLATION AND METHOD FOR REMOVING SKIN FROM SLAUGHTERED POULTRY PARTS

The present invention relates to a skinning installation and method for removing skin from slaughtered poultry parts.

In particular, the invention relates to a skinning installation for removing skin from slaughtered poultry parts, e.g. from the breast, comprising a support frame, a toothed skinning roller which is rotatably supported by the support frame and has teeth gripping the skin, and a skinning roller drive that is adapted to drive the skinning roller in a rotation direction. Furthermore the skinning installation comprises an elongated shoe having opposed ends, at least one of which is fastened to the support frame, said shoe extending adjacent and essentially parallel to the toothed skinning roller.

From the prior art, automated installations are known for removing skin from poultry parts, including a skinning device and a conveyor for moving poultry parts along the skinning device. E.g. from US2011/0092146 an installation for removing skin from the shoulder and neck areas of a chicken carcass is known wherein the skinning device comprises a rotatable skinning roller and a cooperating shoe.

The known installations have proven to be unsatisfactory, in particular for skinning poultry breast parts. Known disadvantages are the disappointing quality of skinning: manual removal of residual skin is frequently required. Another known disadvantage is the jamming of the installation: manual assistance to remove the jammed skin from the skinning device is frequently required.

The aim of the present invention is to provide a skinning installation and method for removing skin from the poultry parts wherein the overall efficiency and/or skinning quality has improved. Preferably, less poultry parts are damaged, resulting in less downgrades. As a result, the yield of deskinned poultry increases.

This aim is achieved according to the present invention by providing a skinning installation, wherein a shoe is provided comprising:
- a central nose portion which is directed counter to the rotation direction of the skinning roller, having two side edges and a leading skin gripping edge, wherein the side of the nose portion facing the skinning roller comprises an arcuate surface having a curvature corresponding essentially to the curvature of the skinning roller, wherein a skin gripping gap is defined between the arcuate surface of the central nose portion and the skinning roller;
- at least one bridging portion between the central nose portion and the end of the shoe that is fastened to the support frame, arranged downstream of the leading skin gripping edge when seen in the rotation direction of the skinning roller, wherein a bridge clearance is defined between the bridging portion and the skinning roller.

The aim is furthermore achieved by a method for removing skin from slaughtered poultry parts.

The effect of the inventive shoe design is that the overall efficiency and/or skinning quality has improved. A possible advantage is the improved removal of skin with fat thereon, in particular fatty chunks.

The skinning installation and method according to the present invention are designed for removing skin from slaughtered poultry parts, e.g. removing skin from a breast part of chicken. Poultry includes for example chicken, duck, geese and turkey. The slaughtered poultry comprises at least meat, and the skin that is naturally present thereon.

The inventive installation is primarily provided in view of skin that is removed from a breast part, but is also conceivable that the installation is designed to remove skin from the shoulder and neck areas, the back, the legs, drums, thighs etc. On the breast, the fillets are present. Skin is naturally present on the breast, between the tail end and the neck end and extending to the flanks of the fillets. The skinning installation and method of the invention is preferably capable of removing all the skin from the breast: both from the upper end, and from the sides or flanks of the fillets. Therefore, in a preferred embodiment of the installation, no further skinning devices for the flanks or sides are provided.

Breast skin may be present on a whole carcass, or on a breast part, e.g. a breast cap or a front halve.

The skinning device comprises a support frame which rotatably supports a toothed skinning roller, allowing the toothed skinning roller to revolve about a longitudinal rotation axis. A skinning roller drive is provided, that is adapted to drive the skinning roller in a rotation direction.

The skinning roller is possibly cylindrical, having an outer circumferential roller surface and a longitudinal roller rotation axis.

The skinning roller is preferably made of stainless steel, but it is also conceivable that the roller is made of plastic or ceramics.

The preferred diameter of the skinning roll depends on the dimension of the poultry part of which the skin is to be removed. For example, for breast fillets of poultry, a preferred skinning roller diameter is 5-20 cm, more preferably 5-15, or even more preferably about 10 cm.

The toothed skinning roller is provided with teeth, which are adapted to grip the skin that is to be removed. Possibly, only an axial section of the skinning roller is provided with teeth. Preferably, the teeth are provided at least on a centrally located axial portion of the skinning roller. Even more preferably, the teeth are provided on a large axial portion of the skinning roller. The teeth are optionally provided in a pattern, e.g. elongated teeth extending parallel and at a distance to each other, e.g. a helical pattern. Optionally, the teeth extend parallel to each other and to the longitudinal axis of the skinning roller. It is conceivable that axial portions with different patterns of teeth are provided on a single skinning roller: e.g. the angle of the helix may differ from one axial section to another. The teeth preferably comprise a configuration so as to reduce the tendency to pierce the outer skin, which may lead to a greater tendency to rip or tear the skin, and less efficient removal of the skin from the poultry part. E.g., the teeth have a flattened upper side.

Furthermore, an elongated shoe is provided, having opposed ends, at least one of which is fastened to the support frame, the shoe extending adjacent and essentially parallel to the skinning roller. The elongated shoe is preferably mounted stationary to the support frame, but a resilient mounting is also possible. In a possible embodiment, the distance between shoe and skinning roller is adjustable, thereby setting the skin gripping gap. The shoe has an elongated configuration parallel to the skinning roller. In an embodiment, both opposed ends of the shoe are fastened to the support frame.

The shoe has a central nose portion which is directed counter to the rotation direction of the skinning roller. Hence, the nose portion extends in an upstream direction of the skinning roller. The central nose portion of the shoe is provided adjacent the toothed skinning roller, or at least adjacent the toothed portion of the skinning roller.

The central nose portion has two side edges and a leading skin gripping edge. The skin gripping edge is adapted to grip the skin that is to be removed, so that it enters between the skinning roller and the shoe. The leading skin gripping edge is preferably a blunt edge to prevent skin damage. Possibly the leading skin gripping edge is straight, and extends essentially parallel to the axis of the skinning roller. The two side edges of the central nose portion may extend essentially perpendicular to the leading edge, or, as is preferred, at a diverging angle, such that the nose portion and arcuate surface widens in rotation direction. In the event a breast piece is being skinned, the length of the leading skin gripping edge is preferably smaller than the width of the breast, the length is e.g. 4-8 cm. For other products, a length of the skin gripping edge of e.g. 4-10 cm is envisaged.

The side of the nose portion facing the skinning roller has an arcuate surface, having a curvature corresponding essentially to the curvature of the skinning roller. The arcuate surface starts from the leading edge.

According to the invention, the shoe is mounted adjacent to and essentially parallel to the toothed skinning roller. A skin gripping gap is defined between the arcuate surface of the central nose portion and the skinning roller. Preferably, the arcuate surface of the central nose portion is provided very close and adjacent to the toothed skinning roller, such that a skin gripping gap of preferably 0.1-0.5 mm is defined. This gap or slit allows skin to be received in the gap and to be gripped by the rotating skinning roller and pulled from the meat of the poultry part.

Preferably the length of the central nose portion in the direction of rotation, is such that at least 4 teeth of the toothed skinning roller oppose the arcuate surface, in particular 5-10 teeth. This is important in order to provide sufficient grip for the skin to be removed. The length may e.g. e.g. be 3-6 cm.

The elongated shoe further comprises at least one bridging portion between the central nose portion and the end of the shoe that is fastened to the support frame. The bridging portion is arranged downstream of the leading skin gripping edge, when seen in the rotation direction of the skinning roller. A bridge clearance is defined between the bridging portion and the skinning roller. The bridge clearance is such that it at least allows portions of the skin to be moved along with the skinning roller and to pass underneath the bridge portion of the shoe. The bridging portion of the shoe is provided adjacent the toothed skinning roller, preferably adjacent the toothed portion of the skinning roller.

In a preferred embodiment, at least one of the bridge clearances is larger than the skin gripping gap, allowing skin with a chunk, e.g. a fatty chunk, thereon to rotate along with the skinning roller and to pass through the larger bridge clearance. Skin with a chunk, e.g. a fatty chunk, thereon is for example naturally present in the vicinity of the neck of poultry. As the poultry is commonly cold (e.g. below 10° C.) during skinning, the fat is stiff and hard and stuck to the skin. It is conceivable that the skin gripping gap is 0.1-0.5 mm, and that one or both bridge clearances are 1-20 mm. It is also conceivable that the skin gripping gap is 0.1-0.5 mm, and that one bridge clearance is 1-10 mm, and the other bridge clearance is 10-20 mm. In an alternative embodiment, it is also conceivable that one or both of the bridge clearances have a dimension similar to that of the skin gripping gap.

In a possible embodiment, the skinning roller comprises one or more push protrusions, provided opposite a corresponding bridging portion of the shoe, which is/are rotatable within in the corresponding bridge clearance. Upon rotation, the push protrusion assists in clearing the bridge clearance from skin portions that may have got stuck in the bridge clearance, e.g. with a major fatty chuck thereon.

In an embodiment, the toothed skinning roller is provided with one or more circumferential grooves extending in the rotation direction of the roller, the grooves preferably having a depth exceeding that of the teeth. The skinning device is preferably further provided with one or more final release cams in the vicinity of the skinning roller, downstream of the shoe, seen in the rotation direction, which final release cams each extend into a circumferential groove, to assist in or guarantee releasing the skin from the skinning roller. The final release cams are preferably supported by the support frame.

Possibly, in order to further ameliorate the removal of skin from the skinning roller, the or at least one final release cam is provided with a passage coupled to a source with an outlet for the discharge of a liquid and/or gas, e.g. compressed air, to provide liquid and/or gas between the skin and the skinning roller.

Alternatively, in order to further ameliorate the removal of skin from the skinning roller, the skinning installation may further be provided with a blowpipe, provided in the vicinity of the skinning roller, downstream of the shoe, comprising a passage coupled to a source with an outlet for the discharge of a liquid and/or gas, e.g. compressed air, to provide liquid and/or gas between the skin and the skinning roller. Preferably, the blowpipe is provided between two release cams, possibly adjacent the center of the central nose portion.

Preferably, no circumferential grooves are provided that pass under the center of the central nose portion of the shoe, wherein the circumferential grooves are preferably provided at a distance of at least 10 mm from the center of the central nose portion of the shoe. Grooves provided in the skin gripping gap may damage the skin or meat because of the large opening, and possibly deteriorate the skin gripping capacity of the skin gripping gap.

It is conceivable that the skinning roller is composed of multiple cylindrical roller portions, between which one or more circumferential grooves are provided, the multiple cylindrical roller portions being rotatably supported by the support frame to revolve together about the common roller rotation axis. It is conceivable that in this embodiment, the final release cams are supported by the skinning roller itself, between the cylindrical roller portions, within the grooves.

Optionally, the skinning device further comprises a cleaning roller, rotatably supported adjacent the skinning roller, downstream of the shoe, seen in the rotation direction. The cleaning roller may be provided to assist in skin removal from the skinning roller. Preferably, the cleaning roller is made of plastics, although it is also conceivable that it is made of steel or ceramics. The cleaning roller could in an embodiment be embodied with bristles.

Skin that has been removed from the meat by the combined action of skinning roller and shoe is in a preferred embodiment allowed to fall down under the influence of gravity downstream of the shoe, seen in rotation direction. Preferably, the skinning roller is arranged vertically.

Preferably, the shoe further comprises one or more guides, e.g. pins or a plate, which are directed in the rotation direction of the skinning roller, protruding rearward, essentially opposite the central nose portion. These guides guide the skin away from the shoe, and prevent the removed skin from curling back in the direction of the meat, e.g. around the shoe.

Embodiments are conceivable where the skinning roller and shoe are provided essentially horizontal. The poultry part may be passed above the skinning roller, such that the skin pulled from the poultry part may fall down under the influence of gravity. It is also conceivable to provide the skinning roller and the shoe essentially vertical. This embodiment also has the advantage that skin pulled from the poultry part may fall down under the influence of gravity. Even more preferably, in this vertical orientation of the skinning roller, the upper bridge clearance is larger than the lower bridge clearance. For example, the lower clearance is chosen similar to the skin gripping gap or at least such that the skin in said region is still propelled by the roller, whereby the upper bridge clearance is far greater, e.g. more than 5 mm to allow for passage of skin with fatty chunks thereon.

In a vertical orientation both the shoe and the skinning roller are mounted to the support frame, preferably both at their upper sides and the under ends. Optionally, the support frame is provided directly, in the direction of the shortest path, between the shoe and the skinning roller. This has the disadvantage that skin removed from the poultry part, falling down downstream of the shoe may fall onto the support frame, thereby hindered in its removal. It is preferred that no structural parts of the support frame hinder the skin from dropping down.

This is advantageously achieved by connecting the lower part of the skinning roller and the lower end of the elongated shoe via a support frame diversion, such that the area between the shoe and skinning roller, and preferably also an area downstream in rotation direction of the skinning roller, is free of support frame, creating a clear area for the removed skin to drop down.

In an embodiment, the skinning installation further comprises a skin collection unit, e.g. a bin, provided in the vicinity of the skinning device, e.g. below the skinning device, to collect skin that is pulled from the poultry part by the shoe and skinning roller.

It is conceivable that the skinning installation according to the invention is a stand-alone device to which slaughtered poultry parts can be fed manually for deskinning.

Alternatively, the skinning installation further comprises a conveyor for slaughtered poultry parts, which conveyor is adapted to interact with the skinning device, the conveyor having a conveying direction essentially tangent to the direction of rotation. The skinning device is arranged adjacent the conveyor allowing the skin of the poultry to be received in the skin gripping gap. In the preferred embodiment wherein the skinning roller and the shoe are arranged essentially vertical, the skin gripping gap is also vertical and the conveying direction is thus preferably horizontally.

It is noted that poultry processing speeds in general are capable of processing poultry at a rate of 1000-10.000 pieces of poultry per hour. Preferably, a skinning installation according to the invention comprising a conveyor, comprises a skinning device that is capable of skinning at a rate of at least 1000 poultry parts an hour.

For example, the conveyor comprises a series of poultry part carriers, e.g. for parts including the breasts of slaughtered poultry. Possibly a carrier as disclosed in NL2007492 is applied, in particular a carrier for supporting a carcass part of slaughtered poultry, which carcass part comprises an inner face and an outer face, which carcass part further comprises at least a part of the corpus sterni of the sternum, the corpus sterni comprising at least a part of the facies visceralis sterni, and at least a part of the facies muscularis sterni, the inner face being on the same side of the sternum as the facies visceralis sterni and the outer face being on the same side of the sternum as the facies muscularis sterni, the carrier comprising:
 a carrier body, said carrier body comprising a support surface for engaging at least a part of the inner face of the carcass part,
 a hook for holding the carcass part on the carrier body,
 a positioning element for positioning the carcass part relative to the carrier, which positioning element has a dome shaped engagement end for engaging the inner face of the carcass part,
which positioning element is moveable between a retracted position and an extended position in which extended position the dome shaped engagement end of the positioning element protrudes from the support surface of the carrier body, the positioning element being arranged such relative to the support surface of the carrier body that in its extended position, the dome shaped engagement end of the positioning element engages the inner face of the carcass part at or adjacent to the facies visceralis sterni of the sternum in the region between the left and right margo costalis of the sternum.

Alternatively, it is also conceivable that a (n endless) belt conveyor is applied, onto which the poultry or poultry parts are positioned, and wherein the skinning installation according to the invention is positioned above the belt conveyor.

In an embodiment wherein the skinning device is adapted to interact with a conveyor for slaughtered poultry parts, having a conveying direction essentially tangent to the direction of rotation, the support frame is preferably resiliently mounted to a base of the support frame, allowing the skinning roller and the shoe to follow the contour of the poultry part being transported by the conveyor. Even more preferably, a support frame actuator, e.g. a pneumatic cylinder or a spring is provided to push the shoe against the poultry part of which the skin is to be removed.

In an embodiment the outer surface of the central nose portion of the shoe, opposite the arcuate surface, comprises a recess with respect to the bridging portion. This results in a recessed central portion of the shoe, allowing for a reduced spacing between poultry parts conveyed by the conveyor. The volume of the shoe does not hinder the shoe to follow the contour of rather closely spaced poultry parts conveyed on carriers of a conveyor.

In an embodiment wherein the skinning device is adapted to interact with a conveyor for slaughtered poultry parts, and wherein the conveyor comprises a track and multiple carriers that are driven along said track, each carrier being adapted to support a slaughtered poultry part, further a carrier sensor is preferably provided for detecting an empty carrier. Furthermore, a support frame positioning mechanism (50) is provided in connection with the carrier sensor, which support frame positioning mechanism is adapted to move the support frame between an operational position, wherein the skinning roller and shoe are positioned adjacent the conveyor so as to allow the skin of the poultry part being conveyed to be gripped by the skin gripping gap, and a non-operational retracted position, wherein the skinning roller and shoe are positioned at a distance from the conveyor preventing the skinning roller and shoe to contact the empty carrier.

The invention will be explained in further detail in relation to the accompanying drawings, in which:

FIG. 1b shows the rear view of the skinning installation of FIG. 1a;

FIG. 2b shows the rear view of the skinning installation of FIG. 2a;

Figure 1A:
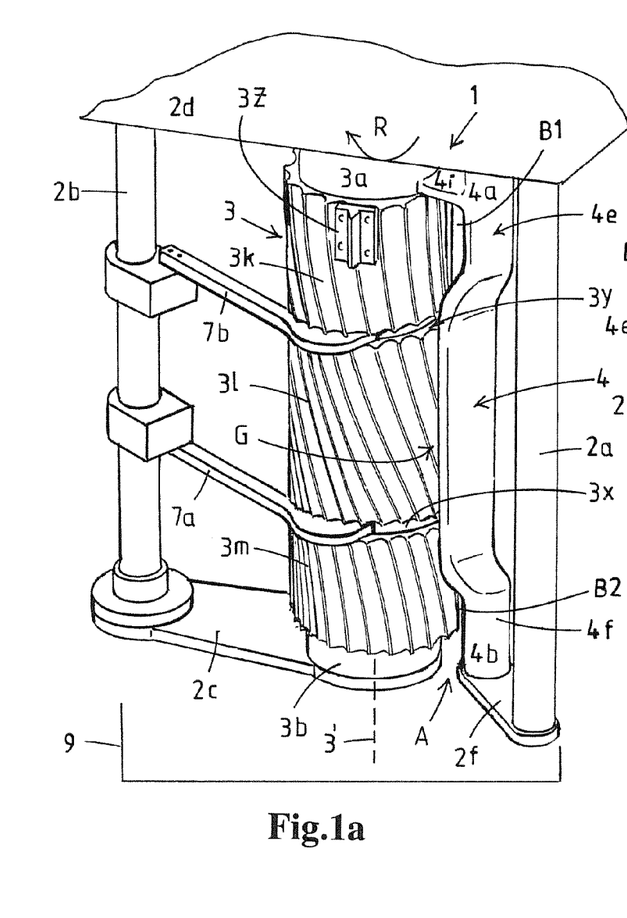
FIG. 1a shows a front view of a skinning installation according to the invention.
Figure 1B:
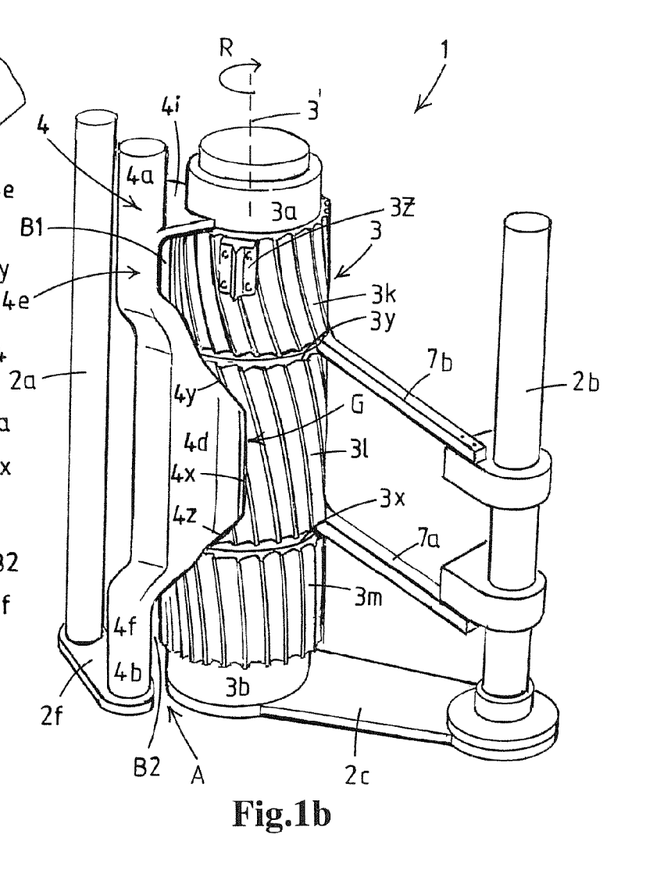
Figure 2A:
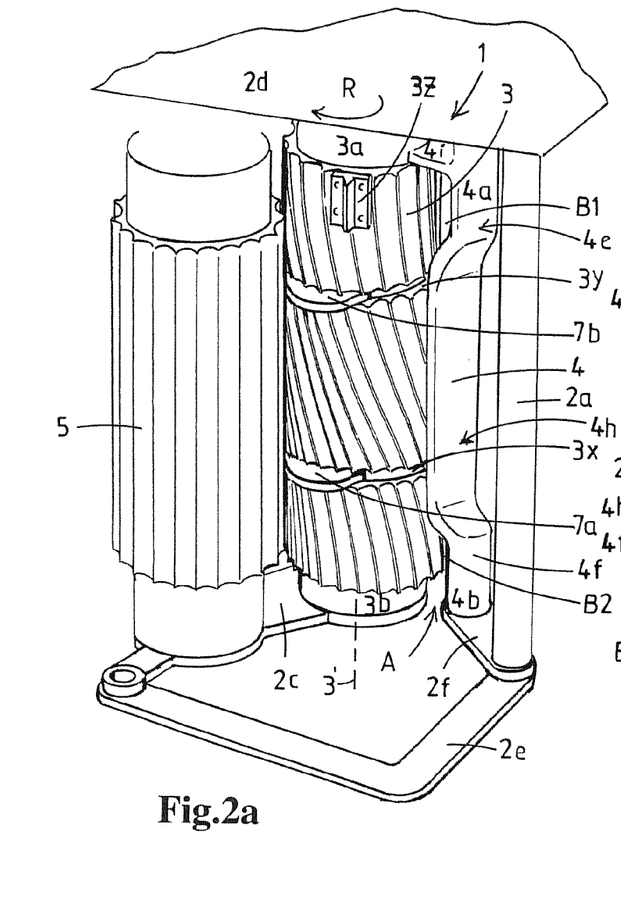
FIG. 2a shows a front view of a skinning installation including a cleaning roller according to an embodiment of the invention.
Figure 2B:
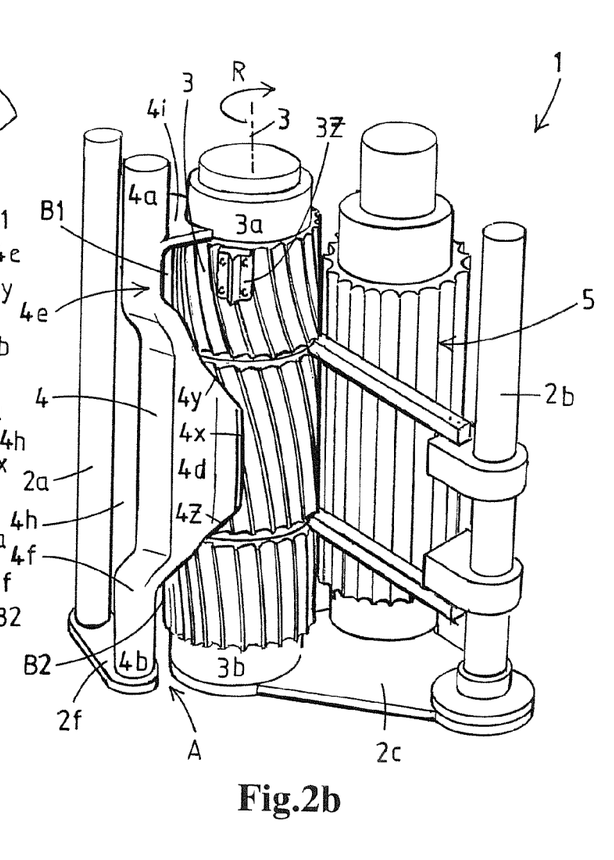

In FIGS. 1 and 2 skinning devices 1 according to the invention are shown in various views. The skinning device for removing skin from slaughtered poultry parts (not shown), comprises a toothed skinning roller 3 and an elongated shoe 4, provided adjacent and essentially parallel to the toothed skinning roller 3. In the shown embodiment, both the skinning roller 3 and the shoe 4 are arranged essentially vertical. In the embodiment of FIGS. 2a and 2b, an optional cleaning roller 5 is provided.

A support frame 2a-2f is provided to rotatably support the toothed skinning roller 3. A skinning roller drive is provided, which is not shown, that is adapted to drive the skinning roller 3 in a rotation direction R, about a rotation axis 3'. Preferably, the rotation speed of the skinning roller is adjustable. A suitable adjustment of the rotation speed of the skinning roller may influence the amount of fat that is entrained with the skin. The elongated shoe 4 has opposed ends 4a, 4b, which in the shown embodiment are both fastened to the support frame 2.

In particular, the shown support frame 2a-2f comprises frame parts 2d and 2c, extending perpendicular to the roller 3, wherein a plate-shaped frame part 2d supports the upper end of the skinning roller 3, and frame part 2c supports the lower end of the skinning roller 3. The support frame 2a-2f further comprises frame parts 2a, 2b, extending essentially parallel to the toothed skinning roller 3, in particular to the rotation axis 3', and the elongated shoe 4. Shoe end 4a is fastened to frame part 2d, while shoe end 4b is fastened to frame part 2f. Hence, in the shown embodiment, the support frame 2a-2f comprises an upper frame part 2d, supporting both the skinning roller 3 and the shoe end 4a. At the lower end, a frame part 2c supports the skinning roller 3, and a frame part 2f supports the shoe 4. These frame parts 2c and 2f are connected via a support frame diversion 2e. This is a preferred embodiment, as this results in a clear area A between the shoe 4 and skinning roller 3, preventing skin piling up. In the shown configuration, also an area downstream in rotation direction of the skinning roller, is free of support frame 2, creating a clear area for the removed skin to drop down. A skin collection unit 9 is schematically shown, provided in the vicinity of the skinning device, e.g. below the skinning device, to collect skin that is pulled from the poultry part by the shoe and skinning roller.

The skinning roller 3 as shown in FIGS. 1 and 2 have a cylindrical configuration, having an outer circumferential roller surface and a longitudinal roller rotation axis 3', here a vertical rotation axis 3'. The toothed skinning roller 3 is provided with teeth, which are adapted to grip the skin that is to be removed. In the shown embodiment, the teeth are provided on a large axial portion of the skinning roller, only the two axial end portions 3a, 3b of the skinning roller surface are essentially smooth and free of teeth.

In the shown embodiment, adjacent the axial end portions 3a of the skinning roller that is free from teeth, the shoe end 4a comprises an abutment face 4i, adapted to abut against the upper end of the teeth of the skinning roller 3, adjacent the end portion 3a. The abutment face 4i extends essentially perpendicular to the shoe and has a curvature corresponding to that of the skinning roller 3.

In FIGS. 1 and 2, the skinning roller 3 comprises three axial sections 3k, 3l, 3m, wherein the pattern of teeth differs for each section. In all sections, the teeth are provided in a pattern, in particular elongated teeth extending parallel and at a distance to each other, to form a helical pattern. In the embodiment shown in FIGS. 1 and 2, the angle of the helix differs from one axial section 3k, 3l, 3m, to another. The teeth preferably comprise a flattened upper side, to prevent skin damage. A suitable design of the teeth may influence the amount of fat that is entrained with the skin.

Figure 3A:
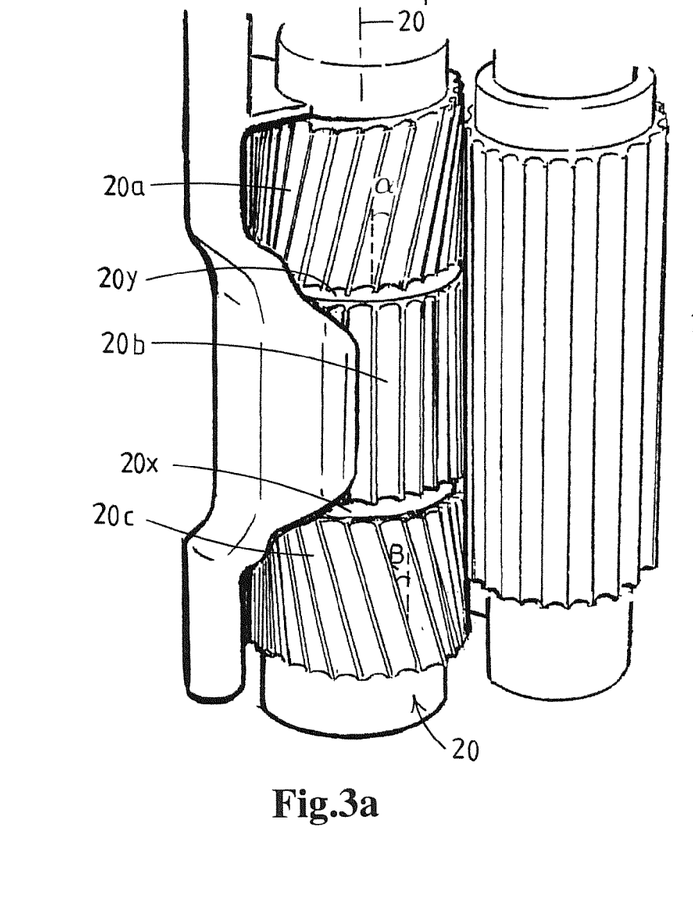
FIGS. 3a and 3b show alternative embodiments of skinning rollers for a skinning installation according to the invention.
Figure 3B:
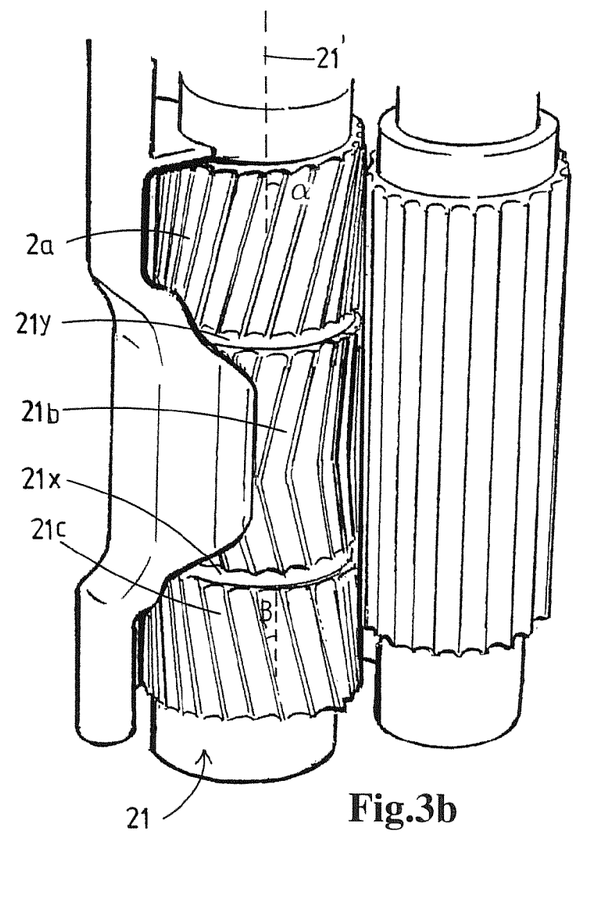

In FIGS. 3a and 3b yet alternative configurations of a skinning roller 20 and 21 respectively are shown. Similar to the embodiment of FIGS. 1 and 2, these skinning rollers also have a cylindrical configuration, and axial end portions free of teeth. Both skinning rollers 20 and 21 comprise three axial sections, wherein the pattern of teeth differs.

Skinning roller 20 comprises a central axial section 20b, wherein the teeth extend parallel and at a distance to each other, and parallel to the longitudinal axis of the skinning roller 20'. The adjacent axial sections 20a, 20c, are also provided with elongated teeth extending parallel and at a distance to each other, forming a helical pattern. However, the angle α of the helix of the upper section 20a is opposite to the angle β of the helix of the lower section 20c. In particular, the angle α between the helix of the upper section 20a and the longitudinal axis of the skinning roller is positive, while the angle β between the helix of the lower section 20c and the longitudinal axis of the skinning roller is negative.

Skinning roller 21 is of a cylindrical configuration with a longitudinal axis 21'. The skinning roller 21 comprises an upper axial section 21a, central axial section 21b and lower axial section 21c. Upper and lower axial sections 21a and 21c are provided with elongated teeth extending parallel and at a distance to each other, forming a helical pattern. The patterns of these sections resemble the patterns of sections 20a and 20c, including the opposite angles of the helices. The central section 21b of skinning roller 21 is also provided with elongated teeth extending parallel and at a distance to each other, however, no helical pattern is being formed but a herringbone pattern. The herringbone pattern comprises two sets of interconnected teeth, one set extending parallel to the upper axial section 21a and the other extending parallel to the lower axial section 21b.

Between the axial sections of the skinning rollers, as is preferred, the shown toothed skinning rollers 3, 20 and 21 are each provided with two circumferential grooves 3x, 3y; 20x, 20y; 21x, 21y, extending in the rotation direction R of the roller. The grooves 3x, 3y; 20x, 20y; 21x, 21y have a depth preferably exceeding that of the teeth. These grooves are provided to receive a final release cam, such that the final release cams extend into the one or more circumferential grooves. The final release cams are provided to release skin, that is possibly still attached to the skinning roller, from the skinning roller. Possibly all the skin falls down from the skinning roller once the skin has past the shoe 4, but it is also conceivable that skin remains adhered to the skinning roller. This is even quite common, as skin comprises fat and is inherently sticky. In FIGS. 1 and 2, it is visible that final release cam 7a is provided in groove 3x, and final release cam 7b is provided in groove 3y. These final release cams 7a, 7b, are provided in the vicinity of the skinning roller 3, downstream of the shoe 4, seen in the rotation direction R. In the shown embodiment, the final release cams 7a, 7b are supported by support frame part 2b.

Figure 6:
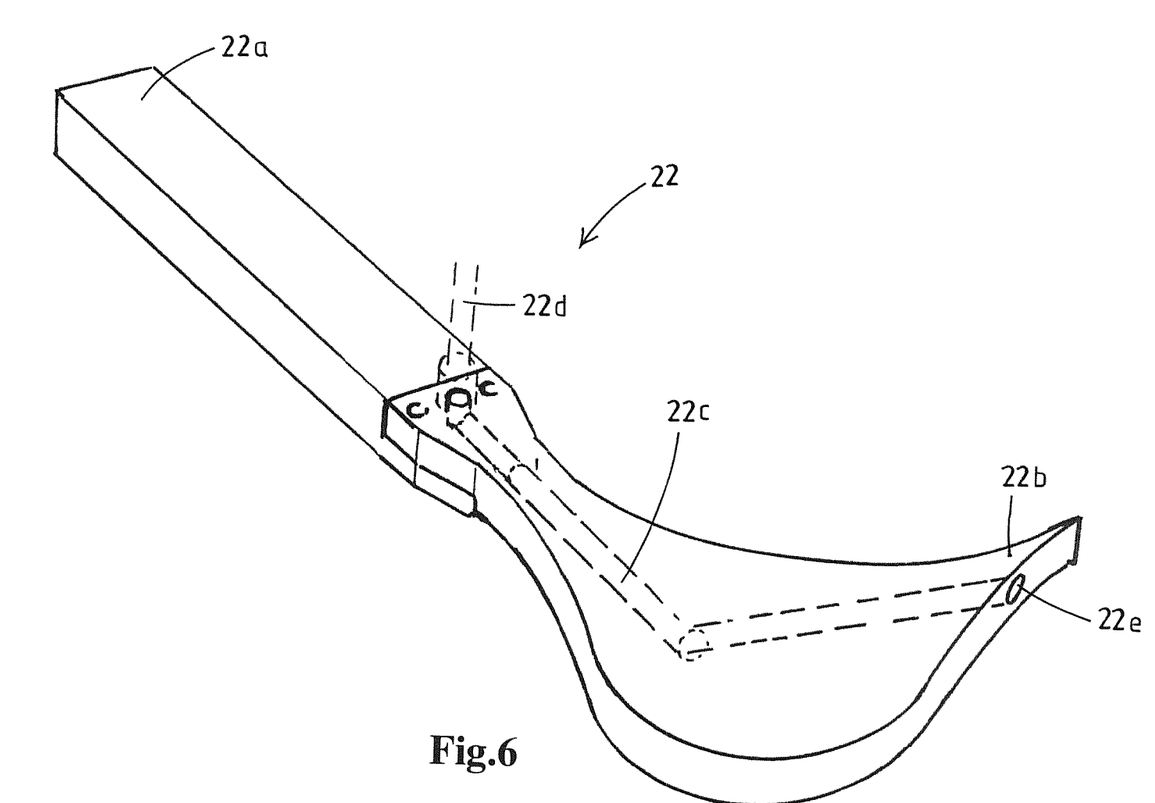
FIG. 6 represents a final release cam for a skinning installation according to a preferred embodiment of the invention.

In FIG. 6, an embodiment of a final release cam 22 is shown in detail. The final release cam 22 comprises an inner end 22a, which is to be supported by the support frame, and an outer end 22b, which is to be received in a circumferential groove. As such, skin that is still present on the skinning roller will come into contact with the outer end of the final release cam and follow its contour, and will thus get detached from the skinning roller. Eventually, the skin will fall off the final release cams. In the embodiment of FIG. 6, an additional measure is provided to assist in skin removal from the skinning roller: the final release cam 22 is provided with a passage 22d, 22c with at the outer end 22b an outlet 22e for the discharge of a liquid and/or gas, to provide liquid and/or gas between the skin and the skinning roller.

In the embodiment of FIGS. 2a and 2b, an optional cleaning roller 5 is provided. This cleaning roller may be provided in addition to the final release cams, as shown, but also instead of a final release cam, or not provided at all. The aim of the cleaning roller is further assist in skin removal from the skinning roller 3.

It is also conceivable to provide a skinning roller made of porous material, wherein at defined locations a cleaning liquid/gas is forced though the pores to remove the skin from the skinning roller.

In the skinning device of FIGS. 1, 2 and 3, a shoe according to the present invention is shown, which will be elucidated below in relation to FIGS. 1 and 2; the shoe as visible in FIG. 3 is similar to this shoe.

The shoe 4 according to the present invention comprises a central nose portion 4d, and two bridging portions 4e, 4f, between the central nose portion 4d and the ends of the shoe 4a, 4b.

The central nose portion 4d protrudes in a direction counter to the rotation direction R of the skinning roller 3. Nose portion 4d has two side edges 4y, 4z, and a leading skin gripping edge 4x. The preferred shape and size of the nose portion 4d is dependent on the type of skin that is to be removed: in particular from which piece of meat and from which type of animal. The skinning device of the shown embodiment is suitable for the removal of skin from the breast fillets of poultry. For this purpose, it is in particular advantageous for the leading skin gripping edge 4x to be longitudinal and extend vertically, parallel to the rotation axis of the skinning roller 3, and to the elongated shoe 4. The length of skin gripping edge is preferably 4-10, in particular 8 cm. In the shown embodiment, the side edges 4y, 4z of the nose portion extend at an angle, such that the base of the nose portion 4d has about twice the length of the skin gripping edge 4x.

The side of the nose portion 4d facing the skinning roller 3, not visible in the drawing, comprises an arcuate surface, having a curvature corresponding essentially to the curvature of the skinning roller 3. A skin gripping gap G is defined between the arcuate surface of the central nose portion 4d and the skinning roller 3.

The two bridging portions 4e, 4f, between the central nose portion 4d and the ends 4a, 4b of the shoe 4 are arranged downstream of the leading skin gripping edge 4x, when seen in the rotation direction R of the skinning roller 3. Between the bridging portions 4e, 4f and the skinning roller 3 two bridge clearances B1, B2 respectively are defined. In particular, in the shown embodiment of the skinning device 1 wherein the shoe 3 and skinning roller 3 extend vertically, an upper bridge clearance B1 and a lower bridge clearance B2 are provided. As is preferred, the bridge clearances B1, B2, are is larger than the skin gripping gap G. This allows skin with a chunk, e.g. a fatty chunk, thereon to rotate along with the skinning roller 3 through the larger bridge clearances B1, B2. In particular, in the shown embodiment, the upper bridge clearance B1 is larger than the lower bridge clearance B2, as a result of which the largest skin with a chunk, e.g. a fatty chunk, thereon are forced to move under the upper bridge clearance B1.

The skinning roller 3 of the embodiment of FIGS. 1 and 2 is provide with a push protrusion 3z, provided opposite a corresponding bridge clearance B1 of the shoe 4, which push protrusion is rotatable with the skinning roller 3 within in the corresponding bridge clearance B1. As such, the push protrusion 3z will push skin/meat pieces that have been agglomerated under the bridge clearance B1 forward, past the shoe 4, to clear the bridge area.

The skin gripping gap G is defined between the arcuate surface of the central nose portion 4d and the skinning roller 3. In particular, a central axial portion of the skinning roller 3 defines this skin gripping gap G. In the embodiments of FIGS. 1-3, the circumferential grooves 3x, 3y; 20x, 20y; 21x, 21y are provided at a distance from the center of the central nose portion of the shoe, such that no circumferential grooves pass under the center of the central nose portion of the shoe.

In FIGS. 1 and 2, it is visible that the outer surface of the central nose portion of the shoe 4d, opposite the arcuate surface, comprises a recess 4h with respect to the bridging portions 4e, 4f. The function of this recess is best understood in relation to FIG. 4c below.

Figure 4A:
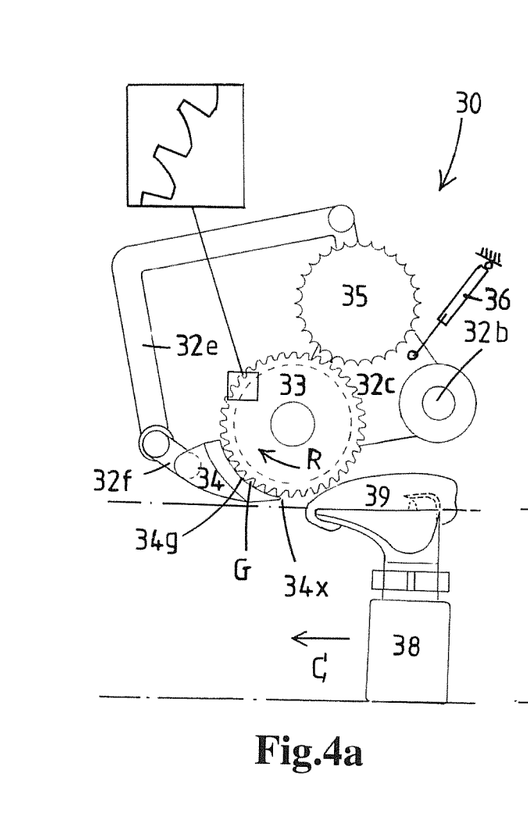
FIGS. 4a-4c show the skinning installation according to the invention schematically in a top view, interacting with a conveyor for slaughtered poultry.
Figure 4B:
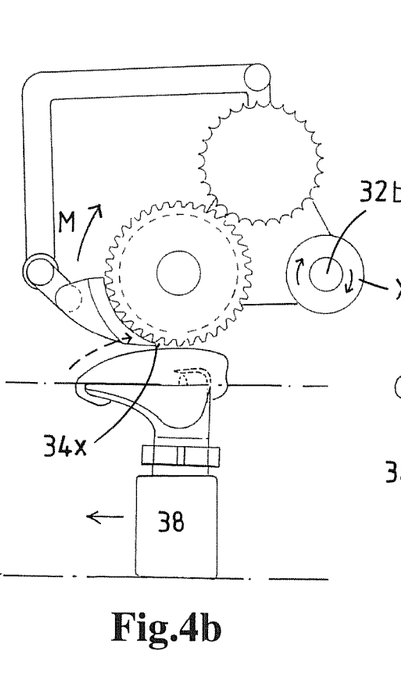
Figure 4C:
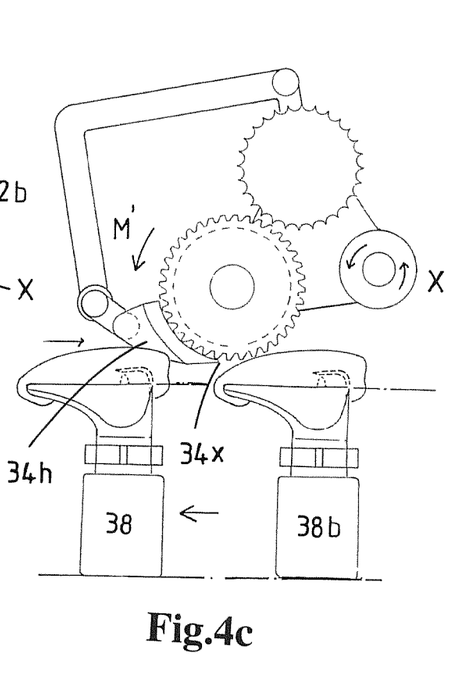
Figure 5A:
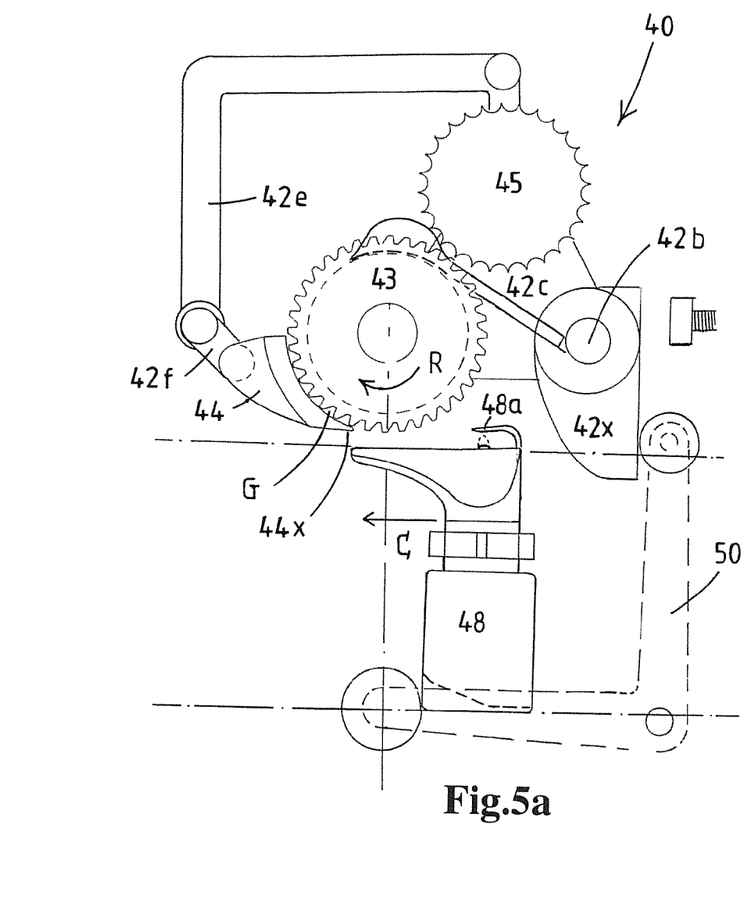
FIGS. 5a-5b show the skinning installation according to the invention schematically in a top view, interacting with a conveyor for slaughtered poultry, wherein a support frame positioning mechanism according to a preferred embodiment of the invention is provided.
Figure 5B:
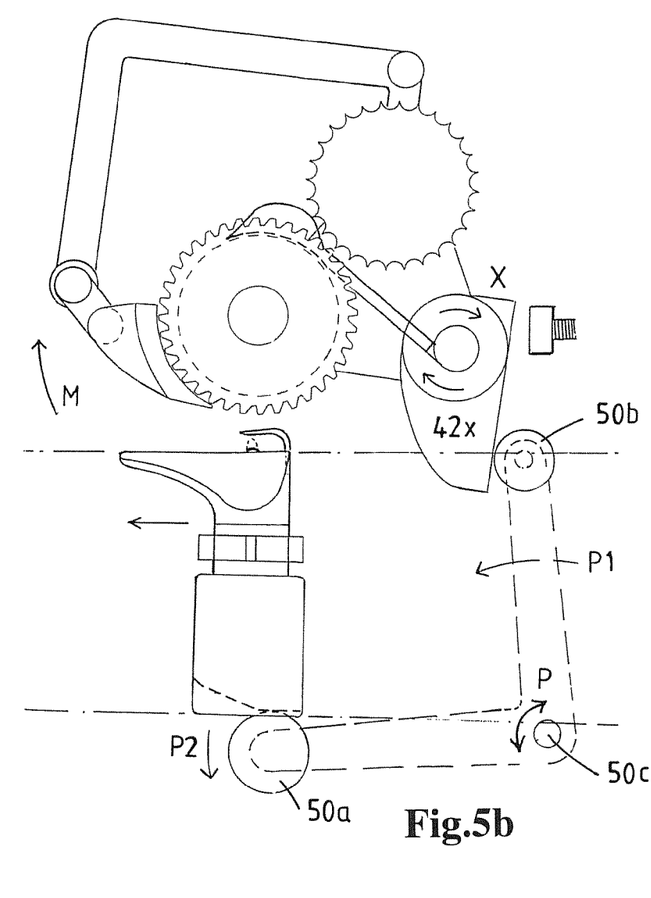

In FIGS. 4 and 5, skinning devices 30 and 40 respectively are shown. As is preferred the skinning roller is vertical so that these figures are in top view. The skinning devices interact with a conveyor for slaughtered poultry, in particular a conveyor comprising carriers 38, 48 for parts of slaughtered poultry comprising breast meat and skin thereon.

The skinning devices 30, 40 each comprise a toothed skinning roller 33, 43, an elongated shoe 34, 44, a cleaning roller 35, 45 and a support frame 32, 42, as explained with reference to the skinning devices of FIGS. 1 and 2. Similar parts have the same reference numerals, to which 30 or 40 is added. In particular, support frame parts 32e, 32f, 32b, 32c and 42e, 42f, 42b, 42c are visible, which are provided similar to the support frame parts 2e, 2f, 2b, 2c, 2e. Support frame parts 32e, 42e are support frame diversions as a result of which the area between the shoe and the skinning roller is clear. This is better visible in the view of FIGS. 1a and 1b. Details of the support frame will be explained later.

In FIG. 4a, a cross section of a portion of the toothed skinning roller 33 is shown in detail. In this cross section, it is visible that the teeth of the shown embodiment have a flattened top as is preferred. Other embodiments of the teeth of the roller are also conceivable.

From the shoe 34, in FIG. 4a the leading skin gripping edge 34x is clearly visible, as well as the arcuate surface 34g of the central nose portion. Also the skin gripping gap G, defined by the arcuate surface 34g and the skinning roller 3, can be discerned.

In FIGS. 4a-4c, and 5a, 5b, a poultry part carrier 38, 48 is schematically represented, which is guided along a track, e.g. a rail here, driven by a conveyor, not shown, having a conveying direction C. The shown carrier is a carrier known from NL2007492. The conveying direction is essentially tangent to the rotation direction R of the skinning roller 33 at the skin gripping edge. On the carrier, in the shown embodiment, breast pieces 39 of poultry are provided, comprising the breast fillets and the skin naturally present thereon. In particular, the poultry breasts are being conveyed in the longitudinal direction. It is preferred to start the skin removal at the tail end of the poultry, and move towards the neck end of the breast.

The support frame 32 of the skinning device 30 of FIG. 4 is resiliently mounted, according to a preferred embodiment of the invention. In particular, the support frame part 32c is mounted pivotably to a support frame part shaft 32b, and is kept in position pneumatically by a cylinder 36. The resiliency is indicated with arrows X adjacent base part 32b of the support frame: the support frame parts 32c, 32e and 32f connected to shaft frame part 32b are allowed to move slightly, and hence, the skinning roller 33 and the shoe 34 attached to the support frame are also allowed to move in the direction M. This resiliency allows the shoe 34 and the skinning roller 33, and in particular the skin gripping edge 34x, to follow the contour of the poultry part which is transported on the carrier 38 by the conveyor.

The biasing force can preferably be adjusted, such that a desired amount of force may be applied to the poultry part, required for the skinning operation. Not enough force results in no skinning action, too much force may cause product damage.

In particular, in FIG. 4a it is visible that the skinning roller 33 and later also the skin gripping edge 34x comes into contact with the breast piece 39 to be skinned, e.g. a front halve of a chicken. The skin is thus fed into the skin gripping gap G. As the outer contour of the breast piece is curved, the skin gripping gap G is allowed to move in direction M, away from the track, as visible in FIG. 4b, and subsequently back in direction M', towards the track, as visible in FIG. 4c, to be able to remove the skin from the entire outer contour of the curved breast poultry part.

It is further visible in FIG. 4c, that the next carrier 48b already arrives at the skin gripping gap G, shortly after the previous carrier having past the shoe 34. In other words, the carriers 38, 38b follow each other very close. This is only possible when the shoe 34, in particular the outer surface of the central nose portion of the shoe, opposite the arcuate surface, comprises a recess with respect to the bridging portions, allowing for a reduced spacing between poultry parts conveyed by the conveyor. This is visible in FIGS. 1 and 2 as recess 4h, which function is best understood in relation to this FIG. 4c.

In FIGS. 5a-5b a similar skinning device as shown in FIG. 4 is represented, now including a safety mechanism 50 for preventing the skinning roller to contact an empty carrier 48. The carrier 48 resembles carrier 38, but now no piece of poultry is provided on the carrier 48. As the skinning roller 43, shoe 44 and the skin gripping edge 44x are provided close to the carrier 48, to come into contact with a piece of poultry thereon, in the shown configuration the skinning roller 43, shoe 44 and the skin gripping edge 44x will bump into the protruding portion 48a of the carrier 48. To prevent such a collision, it is preferred to provide a support frame positioning mechanism (50) is provided in connection with the carrier sensor, which support frame positioning mechanism is adapted to move the support frame between an operational position, wherein the skinning roller and shoe are positioned adjacent the conveyor so as to allow the skin of the poultry part being conveyed to be gripped by the skin gripping gap, and a non-operational retracted position, wherein the skinning roller and shoe are positioned at a distance from the conveyor preventing the skinning roller and shoe to contact the empty carrier.

In the embodiment of FIG. 5, frame parts are resiliently mounted to support frame part shaft 42b, shown with arrows X, similar to the embodiment of FIG. 4. This allows support frame parts 42x, 42c, 42d, 42e, 42f, with the skinning roller 43 and shoe 44, to move away from the carriers in direction M, visible in FIG. 5b, similar to the movement M as shown in FIG. 4b. Different from FIG. 4b, is that now the movement in direction M is not induced by the outer curvature of the poultry part on the carrier, but by the movement of safety arm 50.

In general, a carrier sensor is provided for detecting an empty carrier, which is provided in connection with the support frame positioning mechanism. This sensor can be an electronic sensor. In the embodiment shown in FIG. 5, the carrier sensor is carried out mechanically, embodied as safety arm 50.

Safety arm 50 is mounted to a base via pivot 50c, about which the safety arm is pivotable, indicated with arrow P. Safety arm 50 comprises an end 50a, provided adjacent the carriers, and an end 50b, provided adjacent the support frame positioning mechanism, here resiliently mounted frame part 42b. As visible in FIG. 5a, end 50a of the safety arm comes into contact with carrier 48 when the carrier is transported in direction C. Prior to the carrier 48, in particular carrier part 48a, comes into contact with the skinning roller 43 and shoe 44, the end 50a is forced downwards by the carrier 48, in direction P2, as visible in FIG. 5c. As a result of this pivoting movement of the safety arm 50, the other end 50b of the arm comes into contact with a frame part 42x, connected to the resiliently mounted frame part 42b, and thereby moves the support frame 42 from the operational position shown in FIG. 5a, wherein the skinning roller and shoe are positioned adjacent the conveyor, so as to allow the skin of the poultry part being conveyed to be gripped by the skin gripping gap, to the non-operational retracted position of FIG. 5b, wherein the skinning roller and shoe are positioned at a distance from the conveyor preventing the skinning roller and shoe to contact the empty carriers.

The invention claimed is:

1. A skinning installation adapted to remove skin from slaughtered poultry parts comprising a skinning device, which comprises:

a support frame;

a toothed skinning roller being rotatably supported by the support frame, having teeth gripping the skin;

a skinning roller drive that is adapted to drive the skinning roller in a rotation direction; and an elongated shoe having opposed ends, at least one of which is fastened to the support frame, said shoe extending adjacent and essentially parallel to the toothed skinning roller, wherein the shoe comprises:

a central nose portion which is directed counter to the rotation direction of the skinning roller, having two side edges and a leading skin gripping edge, wherein the side of the nose portion facing the skinning roller comprises an arcuate surface having a curvature corresponding essentially to the curvature of the skinning roller, wherein a skin gripping gap is defined between the arcuate surface of the central nose portion and the skinning roller; and at least one bridging portion between the central nose portion and the end of the shoe that is fastened to the support frame, arranged downstream of the leading skin gripping edge when seen in the rotation direction of the skinning roller, wherein a bridge clearance is defined between the bridging portion and the skinning roller.

2. The skinning installation according to claim 1, wherein at least one of the bridge clearances is greater than the skin gripping gap, allowing skin with a chunk thereon to rotate along with the skinning roller through the larger bridge clearance.

3. The skinning installation according to claim 1, wherein the skinning roller comprises one or more push protrusions, provided opposite a corresponding bridge clearance of the shoe, which is/are rotatable within in the corresponding bridge clearance.

4. The skinning installation according to claim 2, wherein the skinning roller comprises one or more push protrusions, provided opposite a corresponding bridge clearance of the shoe, which is/are rotatable within in the corresponding bridge clearance.

5. The skinning installation according to claim 1, wherein the skinning roller and the shoe are arranged essentially vertical.

6. The skinning installation according to claim 5, wherein the shoe comprises two bridging portions, wherein the upper bridge clearance is larger than the lower bridge clearance.

7. The skinning installation according to claim 5, wherein lower part of the skinning roller and the lower end of the elongated shoe are connected via a support frame diversion, such that the area between the shoe and skinning roller is free of support frame, creating a clear area for the removed skin to drop down through.

8. The skinning installation according to claim 1, wherein the toothed skinning roller is provided with one or more circumferential grooves extending in the rotation direction of the roller, and wherein further one or more final release cams are provided in the vicinity of the skinning roller, downstream of the shoe, seen in the rotation direction, which final release cams each extend into a circumferential groove.

9. The skinning installation according to claim 8, the grooves having a depth exceeding that of the teeth.

10. The skinning installation according to claim 8, wherein a final release cam is provided with a passage with an outlet for the discharge of a liquid and/or gas, to provide liquid and/or gas between the skin and the skinning roller.

11. The skinning installation according to claim 8, wherein no circumferential grooves are provided that pass under the center of the central nose portion of the shoe.

12. The skinning installation according to claim 11, wherein the circumferential grooves are provided at a distance of at least 10 mm from the center of the central nose portion of the shoe.

13. The skinning installation according to claim 1, further comprising a conveyor for the slaughtered poultry parts, which conveyor is adapted to interact with the skinning device, the conveyor having a conveying direction essentially tangent to the rotation direction of the skinning roller at the skin gripping edge.

14. The skinning installation according to claim 13, wherein the support frame is resiliently mounted to a base of the support frame, allowing the shoe and the skinning roller to follow the contour of each poultry part being transported by the conveyor.

15. The skinning installation according to claim 14, wherein the outer surface of the central nose portion of the shoe, opposite the arcuate surface comprises a recess with respect to the bridging portions, allowing for a reduced spacing between poultry parts conveyed by the conveyor.

16. The skinning installation according to claim 13, wherein the conveyor comprises a track and multiple carriers that are driven along said track, each carrier being adapted to support a slaughtered poultry part, and wherein further a carrier sensor is provided for detecting an empty carrier, and wherein a support frame positioning mechanism is provided in connection with the carrier sensor, which support frame positioning mechanism is adapted to move the support frame between an operational position, wherein the skinning roller and shoe are positioned adjacent the conveyor so as to allow the skin of the poultry part being conveyed to be gripped by the skin gripping gap, and a non-operational retracted position, wherein the skinning roller and shoe are positioned at a distance from the conveyor preventing the skinning roller and shoe to contact the empty carrier.

17. The skinning installation according to claim 1, wherein both opposed ends of the shoe are fastened to the support frame, and wherein the shoe comprises two bridging portions, each between the central nose portion and one of the ends of the shoe, each arranged downstream of the leading skin gripping edge when seen in the rotation direction of the skinning roller, wherein a bridge clearance is defined between each of the bridging portions and the skinning roller.

18. A method for removing skin from slaughtered poultry parts, comprising the step of using the skinning installation according to claim 1.

* * * * *